(12) United States Patent
Frost

(10) Patent No.: US 7,036,654 B2
(45) Date of Patent: May 2, 2006

(54) CONVEYOR FOR CHANGING THE ANGULAR ORIENTATION OF CONVEYED ARTICLES

(75) Inventor: Charles E Frost, Cincinnati, OH (US)

(73) Assignee: Frost Engineering, Inc., Cincinnati, OH (US)

( * ) Notice: Subject to any disclaimer, the term of this patent is extended or adjusted under 35 U.S.C. 154(b) by 0 days.

(21) Appl. No.: 11/119,580

(22) Filed: May 2, 2005

(65) Prior Publication Data

US 2005/0247547 A1   Nov. 10, 2005

Related U.S. Application Data

(60) Provisional application No. 60/567,371, filed on Apr. 30, 2004.

(51) Int. Cl.
*B65G 47/24* (2006.01)

(52) U.S. Cl. ...................................... 198/406; 198/417

(58) Field of Classification Search ................ 198/406, 198/417
See application file for complete search history.

(56) References Cited

U.S. PATENT DOCUMENTS

| | | | | |
|---|---|---|---|---|
| 2,120,385 A | 6/1938 | Albertoli | ..................... | 198/33 |
| 2,947,406 A | 8/1960 | Hazelton, Jr. | ................ | 198/33 |
| 3,353,651 A | 11/1967 | Witmer | ........................ | 198/32 |
| 3,469,887 A | 9/1969 | Nakahara et al. | ............. | 302/29 |
| 3,623,598 A | 11/1971 | Anfossi | ..................... | 198/165 |
| 3,822,777 A | 7/1974 | Jepsen | .......................... | 198/31 |
| 3,838,771 A | 10/1974 | Whiteford | ................... | 198/238 |
| 4,035,983 A | 7/1977 | Shanklin et al. | ............... | 53/28 |
| 4,058,885 A | 11/1977 | Bergman | ..................... | 29/559 |
| 4,226,324 A | 10/1980 | Stocker | ..................... | 198/405 |
| 4,354,796 A | 10/1982 | Bergman | ..................... | 414/676 |
| 4,492,299 A * | 1/1985 | McLeod | ..................... | 198/417 |
| 4,500,229 A | 2/1985 | Cole et al. | ..................... | 406/88 |
| 4,690,268 A | 9/1987 | Ueshin | ........................ | 198/399 |
| 4,705,157 A | 11/1987 | Bowles | ........................ | 198/405 |
| 4,787,178 A | 11/1988 | Morgan et al. | ............... | 51/418 |
| 4,850,582 A | 7/1989 | Newsome | ................... | 271/185 |
| 5,037,245 A | 8/1991 | Smith | .......................... | 406/88 |
| 5,411,250 A | 5/1995 | Belec et al. | ................ | 271/185 |
| 5,535,997 A | 7/1996 | Croyle et al. | ................ | 271/12 |
| 5,609,237 A * | 3/1997 | Lenhart | ..................... | 198/406 |
| 5,868,549 A | 2/1999 | Lee et al. | ................ | 414/791.6 |
| 5,988,352 A | 11/1999 | Ballestrazzi et al. | ........ | 198/405 |
| 6,371,303 B1 | 4/2002 | Klein et al. | ................. | 209/534 |
| 6,626,103 B1 | 9/2003 | Neumann | ................... | 101/230 |

FOREIGN PATENT DOCUMENTS

JP   63-116436   *   5/1988   ................ 198/417

* cited by examiner

*Primary Examiner*—James R. Bidwell
(74) *Attorney, Agent, or Firm*—Wood, Herron & Evans, L.L.P.

(57) ABSTRACT

A conveyor includes elongated and curved first and second structural beams. Each beam includes a plurality of support tabs projecting outwardly therefrom in opposite directions and the tabs support a corresponding endless belt along the entire length thereof. The two belts operatively connect to at least one drive mechanism and define a conveying path from a first end of the beams to the opposite end. The beams are oriented such that the spacing between the two belts remains relatively uniform along the conveying path. The size, shape, orientation, and spacing of the support tabs cause the endless belts to twist in orientation, preferably by about 180° between entrance and exit ends of the conveying path. During driving of the belts, the belts cause an article held therebetween to change angular orientation as the belts convey the article from the entrance to the exit of the conveying path.

18 Claims, 3 Drawing Sheets

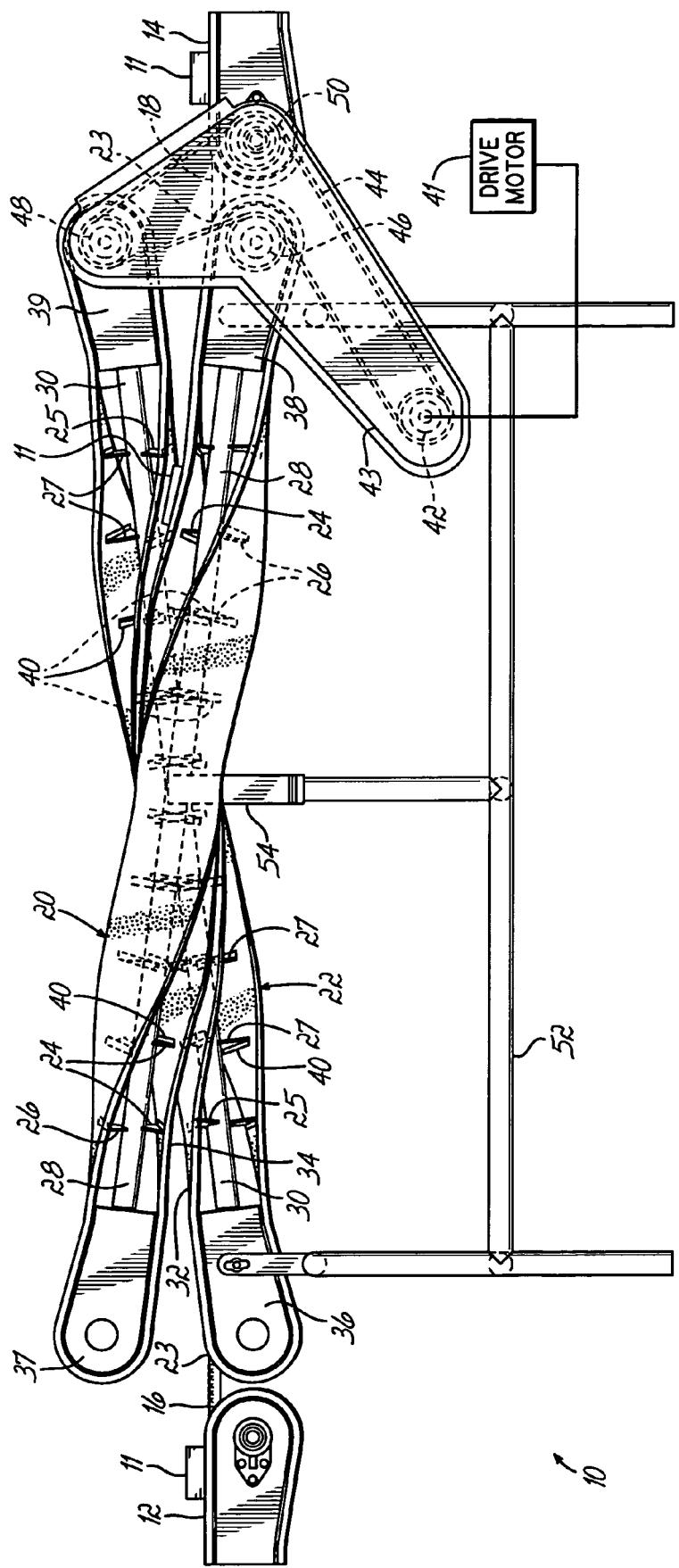
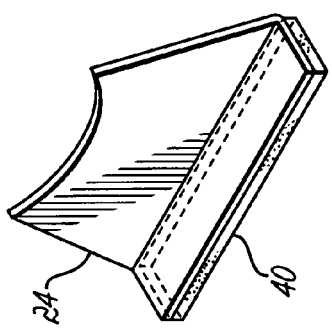
FIG. 3
FIG. 4

CONVEYOR FOR CHANGING THE ANGULAR ORIENTATION OF CONVEYED ARTICLES

CROSS-REFERENCE TO RELATED APPLICATIONS

The present application claims the benefit of U.S. Provisional Application Ser. No. 60/567,371, filed Apr. 30, 2004, the disclosure of which is hereby incorporated herein by reference in its entirety.

FIELD OF THE INVENTION

The invention relates generally to article conveying, and more particularly, relates to conveyors for changing the angular orientation of the conveyed articles.

BACKGROUND OF THE INVENTION

Automated mailing equipment and the like frequently incorporate inverting or orientation-changing conveyors for changing the angular orientation of light, thin articles, such as sheet-shaped articles of material like mailpieces and currency. Conventional inverting conveyors generally include two flexible endless belts each having a span confronting a corresponding span of the other during operation. The confronting spans are contiguous and twisted helically by an angular increment, such as 90° or 180°, relative to one another. Articles captured between the confronting spans are rotated by the angular increment by the curved movement of the confronting spans, which is coordinated by moving the confronting spans in the same downstream direction at a common speed so that the articles are progressively rotated.

Generally, the endless belts are wrapped about entrance and exit rollers or pulleys but are otherwise unsupported along their length. This lack of support limits the application of conventional inverting conveyors for changing the angular orientation of relatively heavy articles, such as filled food packages. For these types of packages, the inversion may be necessary to inspect the packaged food product or for label application. Although the inversion could be accomplished manually by personnel stationed along the packaging line, such manual manipulation of the articles would limit the line throughput. Also, the need for extra personnel would increase labor costs. On the other hand, an inverting conveyor does not reduce the line speed because the package inversion is performed without human intervention.

It is an object of this invention to increase the ability of an article conveyor to handle relatively heavy articles, such as filled food packages, particularly with respect to applications where the conveyor must change the angular orientation of the food package.

It is another object of this invention to optimize throughput and minimize labor costs associated with an orientation changing conveyor, particularly for applications involving filled food packages.

It is still another object of the present invention to overcome the above-described deficiencies of conventional inverting conveyors.

SUMMARY OF THE INVENTION

The present invention achieves the above-stated objects via a conveyor with a pair of longitudinally extending curved structural beams, each beam having, along the length thereof, a plurality of fixedly mounted support tabs projecting outwardly therefrom in opposite directions. For each beam, the mounted tabs support a longitudinally extending endless belt, the belt connected to a drive mechanism. The curved beams are located and oriented in such a way that the belts define a somewhat helical, inverting path from one end of the beams to the opposite end thereof. The size, shape, orientation and spacing of the support tabs carry the respective endless belt along a predetermined path, and in a manner such that the belts are structurally supported along the entire length of the beams with a relatively uniform spacing therebetween.

This longitudinal support of the opposed belts along the conveying path enables an article, i.e. such as a food filled package, to be held securely between the belts while being conveyed along the path. Moreover, the curved orientation of the beams, along with the size, shape, orientation, and spacing of the support tabs provide a path which causes a conveyed package to invert as it moves along the path defined by the beams. Because of the structural integrity of the endless belts along the lengths of the beams, due to the relatively close spacing of the support tabs, this invention readily accommodates the inverted conveying of relatively heavy articles, such as filled food packages. This invention also achieves simple and consistent inversion of conveyed articles, with optimum throughput and minimal labor costs.

According to a preferred embodiment of the invention, each of the outwardly projecting support tabs includes a wear strip, to better accommodate relative movement of the endless belt. Preferably, the wear strips are made of ultrahigh molecular weight polyethylene. Moreover, the gap or spacing between the endless belts along the conveying is relatively uniform along the conveying path where the articles is being inverted.

In accordance with a specific embodiment of the invention, the conveyor may include longitudinally-extending first and second curved structural beams and first and second flexible endless belts each extending longitudinally from an entrance location to an exit location. Each of the flexible belts is configured to move in a direction from the entrance location to the exit location. A first plurality of support tabs project from the first curved structural beam and support the first endless belt. The first plurality of support tabs is configured to guide the first endless belt in a second curved path between the entrance location and the exit location. A second plurality of support tabs projects from the second curved structural beam. The second plurality of support tabs, which support the second endless belt, are configured to guide the second endless belt in a second curved path between the entrance location and the exit location. The first and second pluralities of support tabs position the first and second endless belts to grip the articles therebetween and transport the gripped articles from the entrance location to the exit location so that the angular orientation of the articles is changed, preferably by about 180° so as to cause inversion of the transported articles, while being transported in a space defined between the first and second curved paths.

The above and other objects and advantages of the invention will be apparent from the accompanying drawings and the detailed description.

BRIEF DESCRIPTION OF THE DRAWINGS

FIG. 3 is a side view of the inverting conveyor of FIG. 1.

FIG. 4 is a detailed view of a frontside tab used in the inverting conveyor.

DETAILED DESCRIPTION

Figure 1:
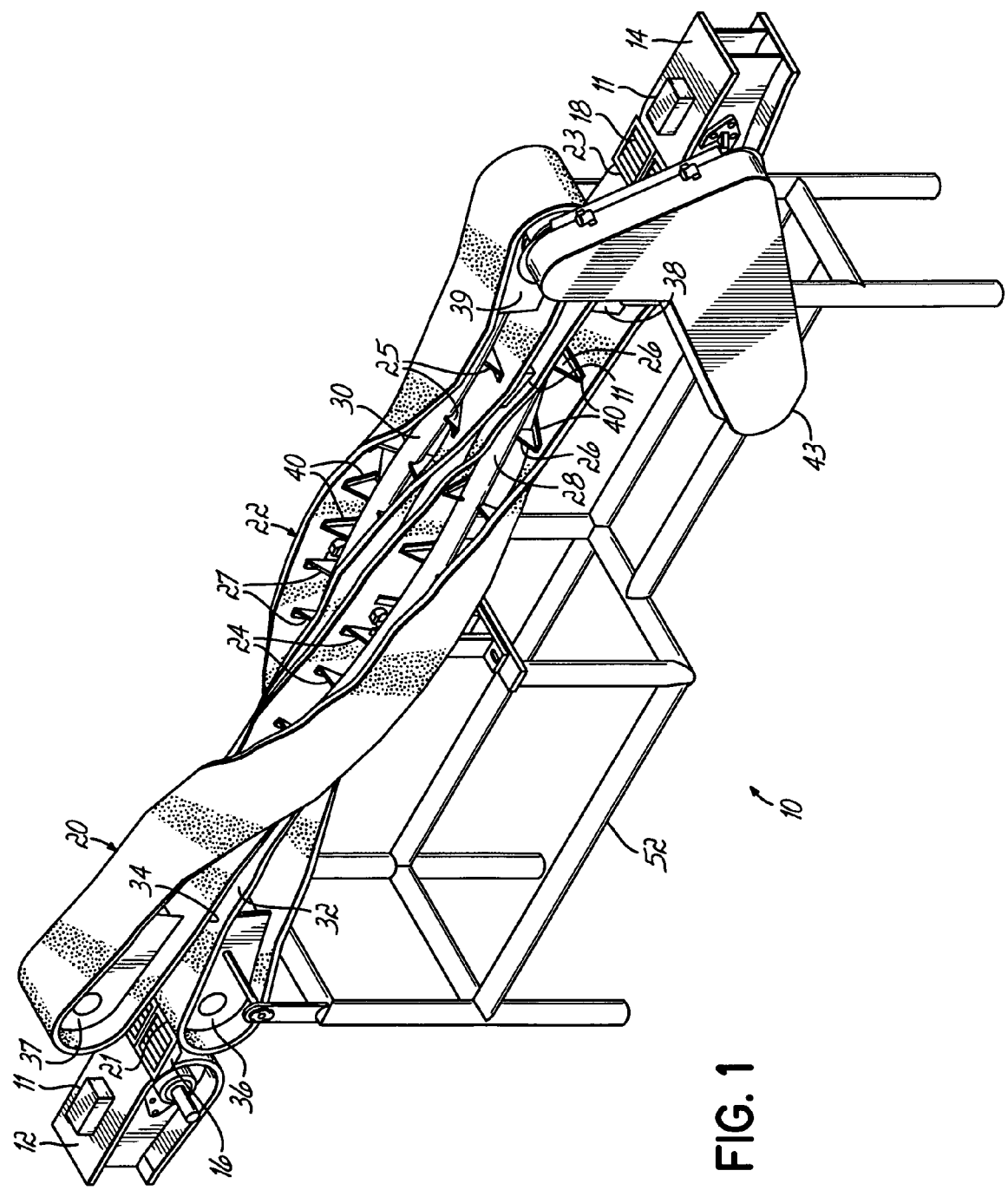
FIG. 1 is a perspective view of an inverting conveyor in accordance with the principles of the present invention.
Figure 2:
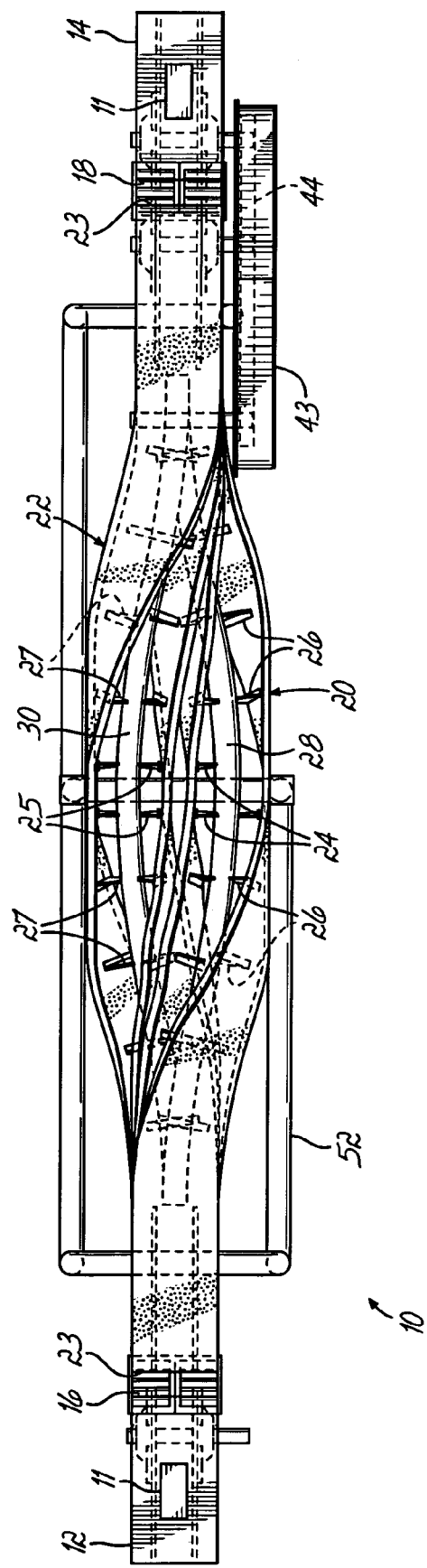
FIG. 2 is a top view of the inverting conveyor of FIG. 1.

With reference to FIGS. 1–4, an inverting conveyor, generally indicated by reference numeral 10, is positioned between an upstream infeed conveyor 12 that delivers successive articles 11 to the inverting conveyor 10 and a downstream takeaway conveyor 14 that transports inverted articles 11 away from the inverting conveyor 10. Bridging the gap between the infeed conveyor 12 and the inverting conveyor 10 is a bead roller section 16. Similarly, a bead roller section 18 bridges the gap between the inverting conveyor 10 and the takeaway conveyor 14. The conveyors 10, 12, and 14 constitute components or segments of a conveying or production line for transferring articles 11, such as food packages, between two locations in a production facility. An entrance end or location 21 is defined at the transition between inverting conveyor 10 and bead roller section 16 and an exit end or location 23 is defined at the transition between inverting conveyor 10 and bead roller section 18. The entrance and exit locations 21, 23 define the upstream and downstream transition points, respectively, between which the inverting conveyor 10 is physically transporting the articles 11 in a downstream direction from the infeed conveyor 12 to the takeaway conveyor 14.

The inverting conveyor 10 incorporates a pair of distinct continuous-loop or endless belts 20, 22, preferably chain belts. In a one embodiment, the belts 20, 22 used in the inverting conveyor 10 are conventional, commercially available plastic modular endless conveyor chain of the type consisting of multiple interlocked rectangular plastic sections in which each plastic section is pivotally attached by transverse connecting rods along parallel axes to two adjacent plastic sections. Suitable belts 20, 22 of this type are commercially available from, for example, Intralox Inc. USA (Harahan, La.).

The belts 20, 22 secure the articles 11 along the length of the inverting conveyor 10 without letting them fall from between the belts 20, 22. To that end, curved paths in the form of spans or flights 32, 34 of the belts 20, 22 confront each other and have a helical relationship along the length of the inverting conveyor 10. As a result, each article 11 is captured in the space defined between the flights 32, 34. Each article 11, which is received with a horizontal orientation from the infeed conveyor 12, is progressively rotated and ultimately inverted (i.e., the angular orientation of the article 11 is rotated by 180°) while being transferred by the collective action of the two belts 20, 22 to the takeaway conveyor 14. At the midpoint of the article path, the article 11 is oriented at 90°. The article 11 is again oriented horizontally due to the 180° rotation but has a different side contacting the takeaway conveyor 14 in comparison with the side of the article 11 contacting the infeed conveyor 12 (i.e., the top face becomes the bottom face). The invention contemplates that the flights 32, 34 may be configured to rotate each article 11 through an angle different from 180°. For example, the flights 32, 34 may be configured to provide a rotation angle of 90° so that the angular orientation is changed from horizontal on the infeed conveyor 12 to vertical at the takeaway conveyor 14. Consequently, while the conveyor 10 of the present invention is described as inverting, a person of ordinary skill in the art will recognize that the change in the angular orientation of the articles 11 is not limited to inversion.

With continued reference to FIGS. 1–4, a pair of elongated structural members or beams 28, 30, such as bent tubular pipes, extend between opposite ends of a support frame 52. The beams 28, 30 are curved along their respective lengths from a first end near the entrance location 21 to a second end near the exit location 23 and are spaced a predetermined distance apart. One of the belts 20 is supported at various lengthwise positions along the length of beam 28 by a plurality of frontside tabs 24 and a plurality of backside tabs 26 projecting from beam 28. The other belt 22 is supported at various lengthwise positions along the length of beam 30 by a plurality of frontside tabs 25 and a plurality of backside tabs 27 projecting from beam 30. The frontside tabs 25 are fixedly mounted to the beams 28, 30 and project outwardly therefrom in an opposite direction from the backside tabs 27. The size, shape, spacing, and orientation of the frontside support tabs 24 is such that, from the entrance location 21 to the exit location 23 of the inverting conveyor 10, the endless belts 20, 22 have a relatively uniform space therebetween and define an orientation changing conveying path therealong.

Each of the backside tabs 26, which defines the return path of the belt 20, is located about the circumference of the structural beam 28 at a location diametrically opposed from a corresponding one of the frontside tabs 24. Similarly, each of the backside tabs 27, which defines the return path of the belt 22, is located about the circumference of the structural beam 30 at a location diametrically opposed from a corresponding one of the frontside tabs 25. The backside tabs 26, 27 are typically of uniform length measured from the surface of the corresponding beam 28, 30.

The relatively uniform space or nip defined between the confronting flights 32, 34 of the endless belts 20, 22, respectively, is specified for securing the articles 11 for the inversion. Typically, the nip is slightly less than the article thickness and is constant along most of the length of the confronting flights 32, 34. Each of the belts 20, 22 contacts one of a corresponding pair of radiused bearing plates 36, 37 at one end (the entrance location) of the inverting conveyor 10 and one of another pair of radiused bearing plates 38, 39 at the opposite end (the exit location) of the inverting conveyor 10. The bearing plates 36, 37, 38, 39 incorporate wear strips 40 that contact the corresponding belt 20, 22 with a low-friction sliding contact.

The belts 20, 22 are trained over and guided by the frontside tabs 24, 25, which have lengths and angular orientations selected to provide the helical 180° twisting of belts 20, 22. The number of frontside tabs 24, 25 is arbitrary and may be selected according to design parameters, such as conveyor length. The frontside tabs 24, 25 are spaced along each flight 32, 34 such that each successive frontside tab 24, 25 has its axis tilted progressively from an almost vertical to an almost horizontal orientation and back to an almost vertical orientation. Thus, the confronting flights 32, 34 retain their grip on the conveyed articles 11 as each progressively twists through 180° degrees so as to invert the article 11. At the entrance location 21 and at the exit location 23 of the inverting conveyor 10, the free ends of the structural beams 28, 30 are overlying vertically.

With continued reference to FIGS. 1–4 and as best shown in FIG. 4, each frontside tab 24, 25 and backside tab 26, 27 is formed from a plate bent 90° to form an angle on one end that is mounted to the corresponding structural beam 28, 30. Mounted on the opposite free end of each tab 24, 25, 26, 27 is wear strip 40 composed of a durable low-friction material having a high thermal coefficient of expansion, such as ultra-high molecular weight polyethylene or "UHMW"

polyethylene. The belts 20, 22 contact each of the wear strips 40 with a sliding relationship. Each frontside tab 24, 25 is flared outwardly and has an outermost width proportional to the chain width. The frontside tabs 24 on structural beam 28 are a mirror image of the frontside tabs 25 on structural beam 30 reflected in a curved plane extending longitudinally between the belts 20, 22. The spacing between any frontside tab 24 on structural beam 28 and the confronting frontside tab 25 on structural beam 30 is constant for each pair of confronting tabs 24, 25, taking into consideration the thickness of the wear strip 40.

In one specific embodiment of the invention, ten frontside tabs 24 are distributed along the length of structural beam 28 with equal spacings between adjacent tabs 24 on either side of a central vertical post 54 of the frame 52 (i.e., the midpoint of the beam 28 and endless belt 20). The first frontside tab 24 nearest to the post 54 has a length of about 1.09 inches (measured from the pipe surface to the outermost angled surface of tab 24) and is oriented at about 90° relative to vertical. The second frontside tab 24 has a length of about 0.59 inches and is oriented at about 72° relative to vertical (i.e., rotated about 18° from the angular orientation of the first frontside tab 24). The third or middle frontside tab 24 has a length of about 0.27 inches and is oriented at about 54° relative to vertical (i.e., rotated about 36° from the angular orientation of the first frontside tab 24). The fourth frontside tab 24 has a length of 0.75 inches and is oriented at about 36° relative to vertical (i.e., rotated about 54° from the angular orientation of the first frontside tab 24). The fifth frontside tab 24 on structural beam 28 has a length of about 1.32 inches and is oriented at about 18° relative to vertical (i.e., rotated about 72° from the angular orientation of the first frontside tab 24). It is apparent that adjacent frontside tabs 24 are oriented with an angular difference of about 18° so that each article 11 is rotated from horizontal to vertical (i.e., by about 90°) when moving from the infeed conveyor 12 to the midpoint between the conveyors 12, 14 near post 54. The sixth through tenth frontside tabs 24 have the same lengths and angular orientations as the first five frontside tabs 24 in a reverse order or, in other words, have a symmetry relative to a plane extending vertically at the midpoint between the infeed and takeaway conveyors 12, 14. For example, the frontside tab 24 adjacent to the first frontside tab 24, as described above, is identical in length to the first frontside tab 24 and is also oriented at an angle of 90°, etc. The frontside tabs 25 along the length of structural beam 30 are constructed with identical lengths and angular orientations as frontside tabs 24 relative to the midpoint of the beam 30 and endless belt 22.

In alternative embodiments of the present invention, the size, shape, spacing, and orientation of the frontside support tabs 24 may be adjusted such that, from the entrance location 21 to the exit location 23 of the inverting conveyor 10, the orientation changing conveying path defined by the endless belts 20, 22 may provide a different change in angular orientation of the articles 11. For example, the frontside tabs 24 may be sized, shaped, spaced, and oriented so that the belts 20, 22 cause each article 11 to change its angular orientation by, for way of examples, 90° or 175°.

In certain embodiments of the invention, the frontside tabs 24, 25 are stiff and rigid so that the travel paths of the belts 20, 22 are well defined relative to the structural beams 28, 30, respectively. In other embodiments of the invention, the frontside tabs 24, 25 may have a limited flexibility over at least a portion of the extent of the flights 32, 34, which is believed to allow a greater range of article thicknesses that inverting conveyor 10 may accommodate.

With continued reference to FIGS. 1–4, a drive in the form of an electric drive motor 41 (FIG. 3) powers the inverting conveyor 10 and is partially covered by a shroud 43. Typically, the motor rating of the drive motor 41 is in the range of ½ horsepower to ¾ horsepower. The drive motor output is transferred from the drive motor 41 by, for example, a gear box (not shown) to a drive gear 42 that frictionally engages and drives a serpentine belt 44. The serpentine belt 44 is wound about a pair of driven sprockets 46, 48 each drivingly engaged with one of the endless belts 20, 22. The serpentine belt 44 is also engaged with an idler gear 50 of takeaway conveyor 14, which is advantageous for belt tensioning. One side of the serpentine belt 44 contacts sprocket 46 and an opposite side of the serpentine belt 44 contacts sprocket 48 so that the sprockets 46, 48 rotate with opposite angular senses (i.e., sprocket 46 rotates counterclockwise about its horizontal axis and sprocket 48 rotates clockwise about its horizontal axis). As a result of the coordinate rotation of the sprockets 46, 48, the confronting flights 32, 34 of the endless belts 20, 22 move with the same speed in a downstream direction from the infeed conveyor 12 to the takeaway conveyor 14.

The speed at which the drive motor 41 moves endless belts 20, 22 may be matched to the belt speed of either or both of the infeed and takeaway conveyors 12, 14. To that end, the belt speed of the infeed and/or takeaway conveyors 12, 14 is coordinated with the belt speed of the inverting conveyor 10. The belt speed matching reduces the acceleration and deceleration of the articles 11 during article transfers between the infeed conveyor 12 and the inverting conveyor 10 and subsequent article transfers between the inverting conveyor and the takeaway conveyor 14. As a result, the operation of the drive motor 41 is coordinated with the operation of other drives for segments of the same conveying line, such as the infeed and takeaway conveyors 12, 14.

The support frame 52, which has a tubular construction, supports the components of the inverting conveyor 10 so that the belts 20, 22 are positioned at a height above the floor suitable to match the heights of the infeed and takeaway conveyors 12, 14. The two structural beams 28, 30 are pivotally attached to the central vertical post 54 of the frame 52 so that the angular orientation of the belts 20, 22 can be varied by modifying their inclination angles. The frame 52 also supports the drive motor 41 and gear box for conserving the floor space near the inverting conveyor 10.

The structural beams 28, 30 and tabs 24, 25, 26, 27 maybe formed from a stainless steel or other suitable metal and the tabs 24, 25, 26, 27 may be TIG welded to the structural beams 28, 30 if formed from a stainless steel. The tabs 24, 25, 26, 27 are attached to the structural beams 28, 30 after the beams 28, 30 are bent into their curved configuration. The wear strips 40 may be pressed onto the free ends of the tabs 24, 25, 26, 27 or attached by any other suitable method known to persons of ordinary skill in the art. The structural beams 28, 30 may be rolled into their curved shape using a conventional pipe rolling machine. The exposed surfaces of structural beams 28, 30, tabs 24, 25, 26, 27, and/or frame 52 may be surface finished by a conventional process, such as electropolishing, for smoothing the exposed surfaces.

In use and with reference to FIGS. 1–4, articles 11 are successively transported on infeed conveyor 12 to the entrance location 21, where the articles 11 are transferred from the infeed conveyor 12 across bead roller section 16 to the belt 22 of inverting conveyor 10. Each article 11 is moved on the belt 22 in a direction toward the takeaway conveyor 14. After traveling a short distance on belt 22, the other belt 20 contacts the opposite side or face of each article 11. Each article 11 is then gripped or held securely between the belts 20, 22 and is transported downstream toward the takeaway conveyor 14.

Each article 11 is inverted by the 180° rotation of the belts 20, 22, which is cooperatively imparted by the lengths and orientations of the frontside tabs 24, 25. Near the exit location 23, belt 22 will lose contact with each article 11, which will be transported downstream on belt 20 and ultimately transferred across bead roller section 18 to the takeaway conveyor 14. The articles 11 are transported in a space defined between the first and second curved paths traced by the belts 20, 22.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

I claim:

1. A conveyor comprising:
   a pair of elongated beams, the beams curved along their lengths from a first end thereof to a second end thereof, and spaced a predetermined distance apart;
   each of the beams including:
   a plurality of fixedly mounted support tabs projecting outwardly therefrom in opposite directions; and
   an endless belt carried by the respective plurality of support tabs, the size, shape, spacing, and orientation of the support tabs being such that, from the first end to the second end, the endless belts have a relatively uniform space therebetween and define an orientation changing conveying path therealong;
   whereby driven movement of the belts relative to the support tabs causes an article held therebetween to change angular orientation as the belts convey the article from the first end to the second end along the conveying path.

2. The conveyor of claim 1 further comprising:
   a drive operative for moving the belts relative to the support tabs.

3. The conveyor of claim 2 wherein the operation of the drive is coordinated with the operation of other drives for segments of the same conveying line.

4. A conveyor for transporting articles, comprising:
   longitudinally-extending first and second curved structural beams;
   first and second flexible endless belts each extending longitudinally from an entrance location to an exit location and each configured to move in a direction from the entrance location to the exit location;
   a first plurality of support tabs projecting from the first curved structural beam and supporting the first endless belt, the first plurality of support tabs configured to guide the first endless belt in a first curved path between the entrance location and the exit location; and
   a second plurality of support tabs projecting from the second curved structural beam and supporting the second endless belt, the second plurality of support tabs configured to guide the second endless belt in a second curved path between the entrance location and the exit location, the first and second pluralities of support tabs positioning the first and second endless belts to grip each article therebetween and transport each gripped article from the entrance location to the exit location so that an angular orientation of the articles is changed while being transported in a space defined between the first and second curved paths.

5. The conveyor of claim 4 further comprising:
   a plurality of wear strips each positioned between one of the support tabs and one of the first and second endless belts, each of the wear strips having a surface contacting one of the first and second endless belts.

6. The conveyor of claim 5 wherein the surface of wear strips is formed from ultra-high molecular weight polyethylene.

7. The conveyor of claim 5 wherein the confronting surfaces are separated by a uniform gap along the longitudinal extent of the first and second flexible endless belts.

8. The conveyor of claim 4 wherein each of the first plurality of support tabs has a first contact surface contacting the first belt and each of the second plurality of support tabs has a second contact surface contacting the second belt, the first and second contact surfaces confronting each other.

9. The conveyor of claim 4 wherein the first curved structural beam has a length extending longitudinally between the entrance location and the exit location and a midpoint along the length, each of the first plurality of support tabs positioned between the midpoint and the entrance location having a different angular orientation and length.

10. The conveyor of claim 9 wherein each of the first plurality of tabs positioned between the midpoint and the exit location has a different angular orientation and a different length.

11. The conveyor of claim 10 wherein the angular orientation of each of the first plurality of support tabs positioned between the midpoint and the entrance location is equal to an angular orientation of one of the first plurality of tabs positioned between the midpoint and the exit location.

12. The conveyor of claim 10 wherein the length of each of the first plurality of support tabs positioned between the midpoint and the entrance location is equal to the length of one of the first plurality of tabs positioned between the midpoint and the exit location.

13. The conveyor of claim 9 wherein the second curved structural beam has a length extending longitudinally between the entrance location and the exit location and a midpoint along the length, each of the second plurality of support tabs positioned between the midpoint and the entrance location having a different angular orientation and length.

14. The conveyor of claim 13 wherein each of the second plurality of tabs positioned between the midpoint and the exit location has a different angular orientation and a different length.

15. The conveyor of claim 14 wherein the angular orientation of each of the second plurality of support tabs positioned between the midpoint and the entrance location is equal to an angular orientation of one of the second plurality of tabs positioned between the midpoint and the exit location.

16. The conveyor of claim 14 wherein the length of each of the second plurality of support tabs positioned between the midpoint and the entrance location is equal to the length of one of the second plurality of tabs positioned between the midpoint and the exit location.

17. The conveyor of claim 4 wherein the support tabs are rigid.

18. The conveyor of claim 4 wherein the first and second curved paths guide the article such that the angular orientation changes by approximately 180° between the entrance location and the exit location.

* * * * *